INVENTORS
CHIKAI II
HIDETAKA YAMASHITA
MOTOSUKE KUWABARA
RIICHIRO SUGIE

BY Paul M. Craig, Jr.
ATTORNEY

INVENTORS
CHIKAI II
HIDETAKA YAMASHITA
MOTOSUKE KUWABARA
RIICHIRO SUGIE

BY Paul M. Craig, Jr.
ATTORNEY

United States Patent Office 3,415,953
Patented Dec. 10, 1968

3,415,953

CALLING-PARTY IDENTIFICATION SYSTEM FOR PARTY-LINE TELEPHONE EXCHANGES

Chikai Ii, Hidetaka Yamashita, Motosuke Kuwabara, and Riichiro Sugie, Yokohama, Japan, assignors to Hitachi, Ltd., Tokyo, Japan, a corporation of Japan Filed Oct. 21, 1965, Ser. No. 499,410
Claims priority, application Japan, Jan. 20, 1965, 40/2,580
2 Claims. (Cl. 179—17)

ABSTRACT OF THE DISCLOSURE

A party-line subscriber identification system. Each party-line subscriber has a rotary counter at his subset. When one subscriber of the party-line goes off-hook the rotary pulse generator at the central location is actuated to send pulses to all the subscribers in the party-line circuit. All the pulse-counters at the subset start counting the pulses being sent out. Each party-line subscriber is assigned a unique number. When the off-hook subset has counted the number of pulses assigned as its identification it actuates the pulse generator to stop sending pulses. The number of pulses sent out identifies the party-line subscriber requesting service.

The present invention relates to party-line telephone exchanges, in which a single telephone circuit line is employed to accommodate a number of telephones in multiple connection. In the party-line telephone exchange and even in the one serving a large number of extension telephones, it will be easy to realize a message-registering system on the switch-board individually to charge telephone calls to the subscribers accommodated in the party-line telephone exchange if the calling party can be identified on the switchboard for each call originating in the party-line system.

The present invention has for its object to provide in a party-line telephone exchange a novel system for identifying the calling party.

According to the present invention, pulse counters, for example, in the form of selecting switches are provided in the respective telephones accommodated in the party-line telephone exchange and different numbers of calling-party indentifying pulses are assigned to the respective extension or party-line telephones. The pulse counters each include a contact which operates only when the counter has counted up the number of identifying pulses assigned to the associated extension or party-line telephone and an off-normal contact, i.e., one restorable only when the system assumes its normal position.

When a call initiated by a party-line telephone, this telephone is connected to the switchboard, the latter immediately starts to send, countering by a rotary switch or another means, identifying pulses successively through the line associated with the calling telephone stepwise to advance all of the pulse counters connected in the line. Subsequently, when the number of identifying pulses assigned to the calling telephone has been counted up by the pulse counter, the latter sends a pulse stop signal to the switchboard, which accordingly ceases to send identifying pulses. In this manner, the calling telephone can be identified on the switchboard upon the basis of the number of identifying pulses actually transmitted therefrom and countered by the rotary switch.

Figure 1:
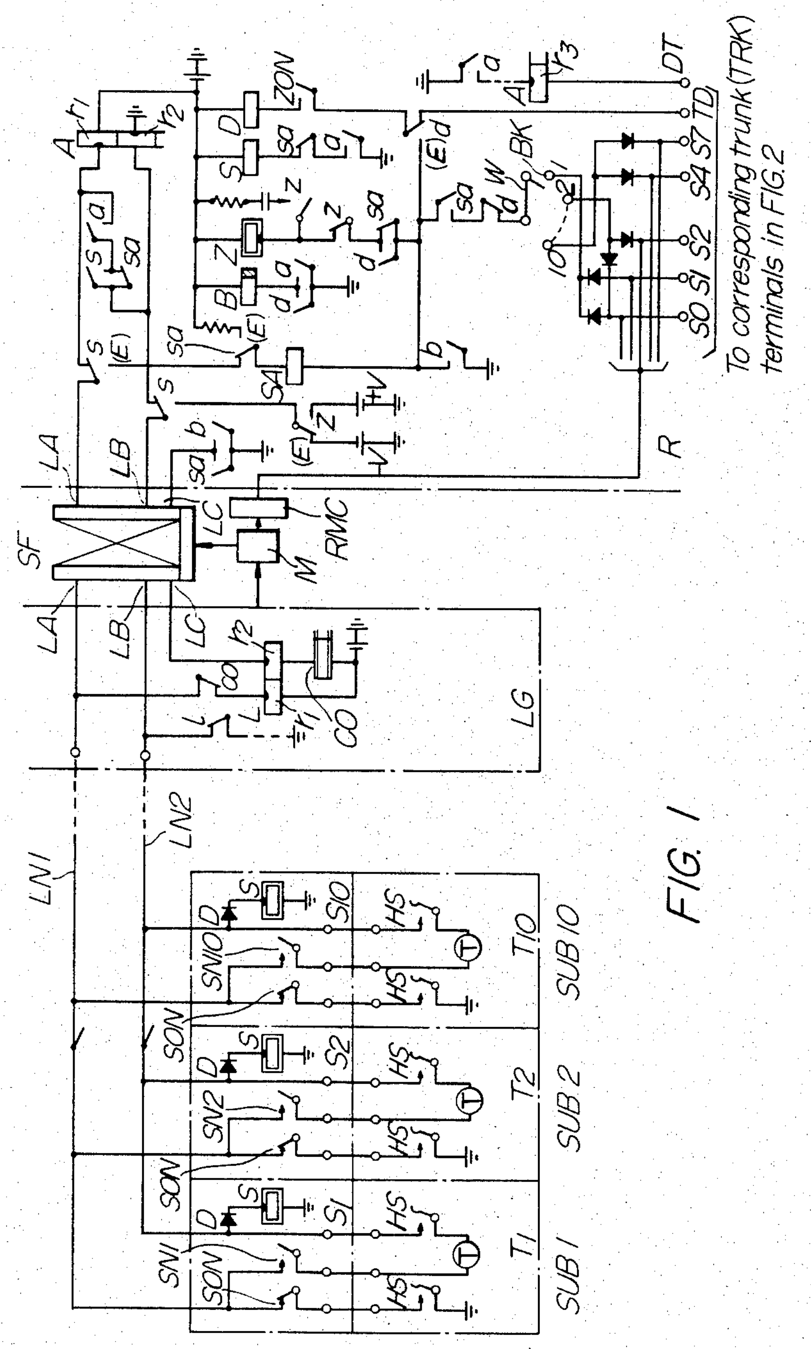
Figure 2:
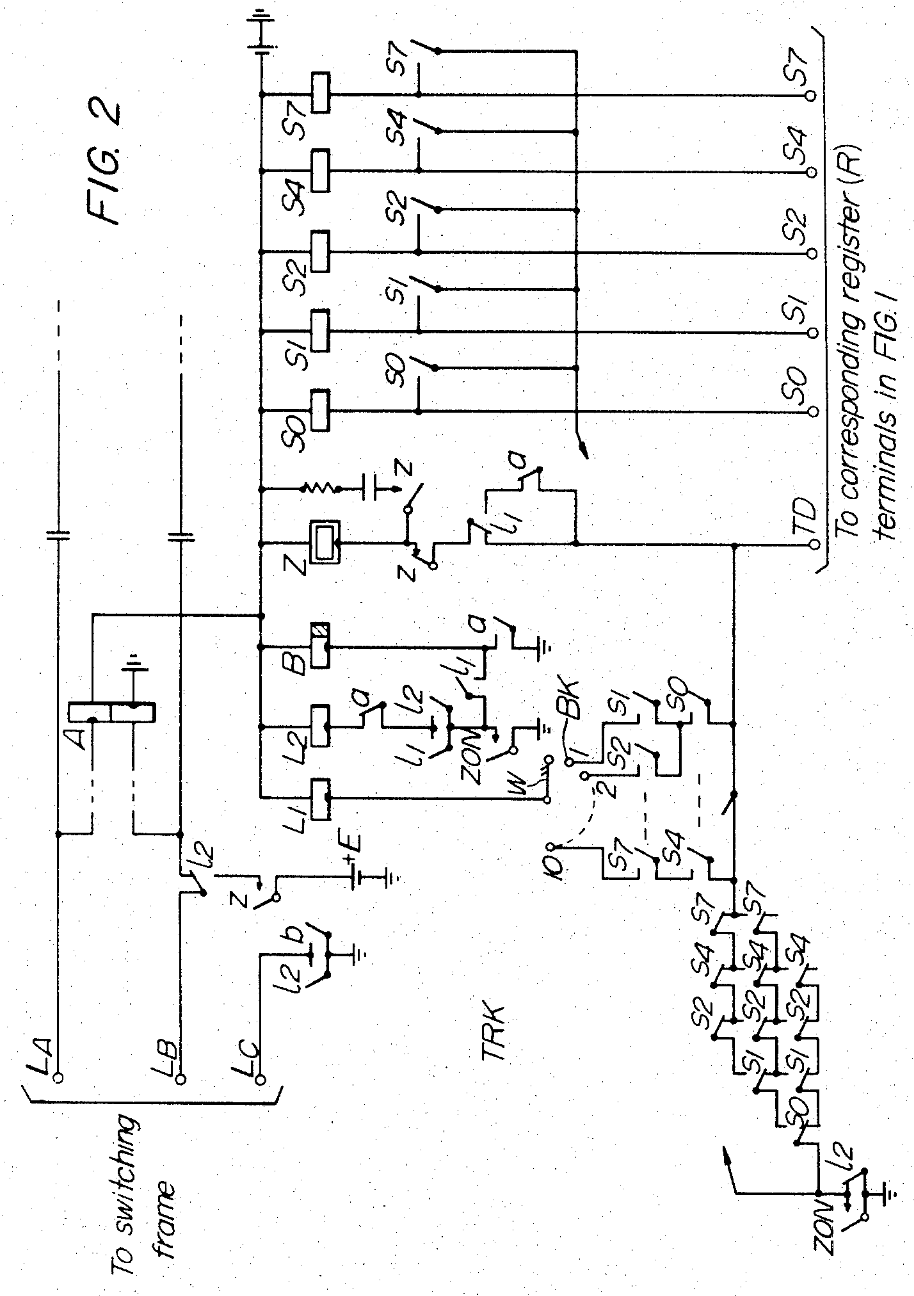

The above and other objects, features and advantages of the present invention will become apparent from the following detailed description when taken in conjuction with the accompanying drawings, which illustrates the circuit arrangement of an automatic party-line telephone exchange system of the crossbar type embodying the present invention and in which:

FIG. 1 illustrates a section of the circuit arrangement including the extension telephones; and FIG. 2 illustrates another section of the circuit arrangement including the trunk side of the exchange system.

In the drawings and in the following description, only those portions of the party-line telephone exchange system which are pertinent to the present invention are dealt with, the remaining portions being conventional and omitted herein for simplicity's sake.

At first, description will be made briefly with reference to FIGS. 1 and 2.

In FIG. 1, ten extension telephones T1–T10 are accommodated in the party-line telephone exchange in multiple connection with a single telephone circuit line LN1–LN2 through the intermediary of respective selecting switches S1–S10. Reference characters LG indicate a line relay group; SF a switching frame including a crossbar switch; M a common-control device or marker; RMC a register-marker connector; and R a register.

FIG. 2 represents a circuit diagram of the trunk TRK.

As shown in FIG. 1, each of the telephones T1–T10 includes a hook switch HS and a handset T, the other components being omitted for simplicity's sake. The selecting switches S1–S10 each include a selecting-switch magnet S, a diode D and an off-normal contact SON which is associated with the switch magnet S so as to operate when the latter is once energized. Contacts SN1–SN10 are arranged in the respective selecting switches S1–S10 and are each operable only when the associated switch magnet S has been energized one to ten times, respectively. In this manner, it will be noted that the extension telephones are each numbered for its identification. The selecting switches may each be constructed, for example, as disclosed in Japanese Patent Publication No. 8752/1963, entitled "Called-party selecting device for a party-line telephone system." In this case, the switch structure includes a rotary shaft which is driven to rotate stepwise by a drive mechanism including: an electromagnet with its armature, a pawl and a ratchet wheel, two discs fixedly mounted on the rotary shaft, and a pair of rollers appropriately positioned relative to each other for cooperation with the respective discs to serve the purpose of controlling the respective sets of contacts.

In FIGS. 1 and 2, reference character Z indicates rotary switch magnets provided in the register R and the trunk TRK; each of the rotary switch magnets includes a mechanical contact $z$, an off-normal contact ZON, a wiper W and bank BK. In the line relay group LG, register R and trunk TRK, relays are indicated by respective capital letters, and their contacts by corresponding small letters.

The operation of the illustrated exchange system will next be described in detail, assuming that the second subscriber SUB2, assigned with a number of identifying pulses, two, is a calling party.

In the following description, M accompanying each of the contact designations means the make position of the contact and B means the break position thereof.

When the subscriber SUB2 raises the handset of telephone T2 to originate a call, the associated hook switch HS is closed to complete a route 1 including: in telephone T2, ground—hook switch HS(M)—off-normal contact SON(B)—line LN1—in the line relay group LG, contact CO(B)—relay L($r_1$)—battery. Accordingly, the relay L in the line relay group is operated, and the subscriber SUB2 is connected with register R by way of the switching frame SF. This connection apparently corresponds to the dial tone connection in conventional exchange systems. When the subscriber SUB2 and register R are interconnected by the marker M, the relay A in the register R is operated to self-hold through a route 2 including: in telephone T2, ground—hook switch HS(M)—off-normal contact SON(B)—line LN1—talking line LA—switch frame SF—talking line LA—contact S(B)—relay A($r_1$)—battery. In the register R, the operation of relay A causes relay B to operate so that the holding magnet S of the crossbar switches (not shown) in the switching frame SF and relays L and CO in the line relay group LG are held through the contact *b* of the relay B. The operation of relay A also causes relay S to operate to separate the talking lines LA and LB from the relay A to insert the talking line LB in an identifying-pulse transmission circuit while inserting the talking line LA into an identifying-pulse stop signal receiving circuit. The operation of relay B forms a route 3 including: ground—contact *b*(M)—contact *sa*(B)—contact *z*(B)—rotary switch magnet Z—battery, thereby to excite the rotary switch magnet Z. The resulting operation of contacts *z* completes a route 4 for each of selecting switches S1 to S10, including: positive battery +V—contact *z*(M)—contact *s*(M)—(by way of talking line LB, switching frame SF and line LN2)—diode D for selector switch S1, S2, . . . or S10—selecting-switch magnets S—ground, and thus the selecting-switch magnets S corresponding to the respective party-line telephones are energized. The rotary-switch magnet Z in the register R, when energized, is cut off the ground through its contact *z* and releases slowly. The operation of contact *z* is effective to break the routes 4 so that the selecting-switch magnets S are released and the selecting switches S1–S10 are advanced a step forward, causing operation of the respective off-normal contacts SON. At the same time, only the first extension telephone T1 assigned with a single pulse for identification gets its contact SN1 closed. However, since the subscriber SUB1 is not calling and the hook switch HS of the telephone T1 is held in its restored position, no circuit including line LN1 and/or LN2 is formed.

Subsequently, when the rotary-switch magnet Z in the register R is again energized through the route 3 to operate its contacts *z*, the routes 4 are formed to energize the selecting-switch magnets S corresponding to the respective extension telephones. Upon energization, the rotary-switch magnet Z in the register R is cut off the ground through its own contact *z* to be released slowly, cutting the routes 4 to allow the selecting switches S1–S10 to be released to a position a step forward. As the result, the selecting switch S1 for the subscribed SUB1 gets its contact SN1 released while the contact SN2 of the selecting switch S2 for subscriber SUB2 is operated. Since the subscriber SUB2 is calling and the hook switch HS of the telephone T2 is closed, the above operation of the contact SN2 of the selecting switch S2 completes a route 5 which includes: in register R, ground—contact *b*(M)—relay SA—contact *sa*(B)—contact *s*(M)—(by way of talking line LA, switch frame SF and line LN1)—contact SN2(M)—telephone handset T—hook switch HS(M)—(by way of line LN2, switch frame SF and talking line LB)—contact *s*(M)—contact *z*(B)—negative battery —V. Consequently, relay SA is operated to self-hold. The operation of relay SA causes the rotary switch Z to stop and accordingly the selecting switches S1–S10 corresponding to the respective extension telephones cease to operate allowing only the calling party to talk. The operation of relay SA also causes releasing of relay S, connecting the talking lines LA and LB with relay A. The self-holding circuit for the relay A is simultaneously cut off but the relay A continues to self-hold by means of the subscriber loop. The register R functions to direct the dial tone signal, flowing through the coil *r*3 of the relay A, through the coils *r*1 and *r*2 to send the dial tone to the subscribed SUB2 as an indication for the subscriber SUB2 to begin dialing.

On the other hand, the marker M sends out a calling-party identifying information in the form of a 2-out-of-5 code through a route 6 which includes: in register R, ground—contact *b*(M)—contact *sa*(M)—contact *d*(B)—wiper W, bank BK of rotary switch Z—register-marker connector RMC—marker M. Upon reception of the calling-party identifying information, the marker M controls to open the register-marker connector RMC to separate from the register R and is released connecting the call meter (not shown) corresponding to the calling telephone with the line associated therewith.

The register R counts and stores the first dialed digit arriving from the calling subscriber SUB2 and is connected with the trunk required. After the register R has been connected with the trunk TRK through an appropriate connecting route, the calling-party identifying information in the form of a 2-out-of-5 code representing the number "2" for the subscriber SUB2 is transmitted to the trunk TRK through the route 7, which includes: in register R, ground—contact *b*(M)—contact *sa*(M)—contact *d*(B)—wiper W, bank BK(2) of rotary switch Z—terminals S0 and S2—in trunk TRK of FIG. 2, terminals S0 and S2—relays S0 and S2—battery. The relays S0 and S2 thus self-hold. The operation of relays S0 and S2, forms a route 8 including: in trunk TRK, ground—contact *l*2(B)—contact *s*0(M)—contact *s*1(B)—contact *s*2(M)—contact *s*4(B)—contact *s*7(B)—terminal TD—in register R of FIG. 1, terminal TD—contact *d*(B)—off-normal contact *zo*N(M) of rotary switch Z—relay D—battery. Thus, the relay D in register R is operated to self-hold. The operation of relay D causes the register R to cut the route 7, through which the calling-party identifying information has been transmitted to the trunk TRK, while at the same time releasing the rotary switch Z in the register R so that the rotary-switch magnet Z is again energized to operate interruptedly. Upon release of the rotary switch Z in register R to its normal position, the off-normal contact ZON of the rotary switch is released to release the relay D. Subsequently, each time when the second or following dialed digit has been counted and stored in the register R, the latter acts to start the marker M to connect the trunk TRK with the called telephone (not shown) through the switching frame SF and is released. The trunk is thus started in the conventional manner, the relays A and B previously assuming their operative position.

On the other hand, the rotary switch Z in the trunk TRK is advanced stepwise operating interruptedly through relays S0 and S2, which receive the calling-party identifying information from register R. When the wiper W of the rotary switch Z takes a step forward, the off-normal contact ZON of the rotary switch is operated. In the above instance, as the rotary switch wiper W takes two steps forward, a route 9 is formed which includes: ground—contact *l*2(B)—contact *s*0(M)—contact *s*1(B) contact *s*2(M)—contact *s*4(B)—contact *s*7(B)—contact *s*0(M)—contact *s*2(M)—bank BK, wiper W of rotary switch Z—relay L1—battery; and thus the relay L1 is operated to stop operation of the rotary switch Z.

Subsequently, when the talk is finished, the relay A in the trunk TRK is released operating the relay L2 and, upon connection of the talking line LB with a releasing-pulse transmitting circuit, and the rotary switch Z is restarted. The interrupted operation of the rotary switch Z causes the selecting switches S1–S10 in the respective extension telephones T1–T10, associated with the line through which conversation has been carried, to be released stepwise in synchronism with the rotary switch Z in the trunk TRK through a route including: in the trunk TRK, positive battery +E —contact *z*(M) operating upon energization of rotary switch Z—contact *l*2(M)—talking line LB—in FIG. 1, switch frame SF—line relay group LG—line LN2—diode D—selecting switch S— ground. When the rotary switch Z in the trunk TRK is released to its normal position (at the same time, it is to be understood that the selecting switches S1–S10 for the respective subscribers SUB1–SUB10 are also released to their normal position closing all of the off-normal contacts), the off-normal contact ZON is released to stop the rotary switch Z while at the same time releasing relays S0, S2 and L2. The release of relay L2 is effective to cut the holding ground from the holding magnet in the switch frame SF so that the trunk TRK is prepared for another call.

To summarize the present invention, each of the extension telephones is equipped with a pulse counter device and when a call is originated from any of the extension or party-line telephones a series of pulses are transmitted from the switchboard to drive the pulse counters accommodated in one and the same telephone circuit line. When the calling telephone has counted up the number of pulses assigned thereto, it sends a signal back to the switchboard (in the described embodiment, through a closed circuit including contact SN2, etc.). The calling telephone can thus be identified on the switchboard upon the basis of the number of pulses transmitted therefrom by the time when the switchboard receives the signal from the calling telephone. It will be appreciated, therefore, that, identification of the calling party can be effected with ease and accuracy in a party-line telephone exchange incorporating the present invention, irrespective of the number of extension telephones accommodated therein. Moreover, where pulse counters in the form of selecting switches are employed as in the embodiment described and shown herein, the privacy of conversation can be maintained perfectly from the other extension telephones.

Though description has been made herein chiefly on the exchange operation for identifying the calling extension telephone, it is to be understood that the exchange operation, when the call is originated from the individual subscriber, is similar to that in the conventional exchange system.

Also, it is to be understood that the invention is not restricted to the features described above and shown in the drawings but may be varied in many ways within the scope of the appendant claims. For example, though the described embodiment is arranged so as to drive simultaneously all of the selecting switches corresponding to respective extension telephones, connected to the line LN1–LN2, modification may be made so as to drive only the selecting switch corresponding to the calling telephone. Further, instead of providing the calling-party identifying circuit and the selecting-switch releasing circuit in the register R and the trunk TRK, respectively, it is also possible to employ separate devices arranged to serve the functions of the respective circuits.

What we claim is:

1. In a party-line telephone exchange, a system for identifying the calling party comprising pulse counters provided in the respective party-line telephones, means for transmitting, when a call is initiated by a party-line telephone subscriber, a series of pulses from the switchboard through the telephone circuit line to drive said pulse counters, and means for sending a signal from the calling telephone to the switchboard when the pulse counter in the calling telephone has counted up the number of pulses assigned thereto, whereby the calling party is identifiable on the switchboard upon the basis of the number of pulses transmitted by the time when the switchboard receives said signal from the calling telephone.

2. In a party-line telephone exchange, a system for identifying the calling party comprising pulse counters provided in the respective party-line telephones, means for transmitting, when a call is initiated by a party-line telephone subscriber, a series of pulses from the switchboard through the telephone circuit line to drive the pulse counter in the calling telephone, and means for sending a signal from the calling telephone to the switchboard when the pulse counter in the calling telephone has counted up the number of pulses assigned thereto, whereby the calling party is identifiable on the switchboard upon the basis of the number of pulses transmitted by the time when the switchboard receives said signal from the calling telephone.

No references cited.

K. CLAFFY, *Primary Examiner.*

A. H. GESS, *Assistant Examiner.*